June 15, 1926.
J. ROUPP
1,588,909
FRONT TRUCK FOR CORN HARVESTERS
Original Filed Sept. 10, 1923    2 Sheets-Sheet 2
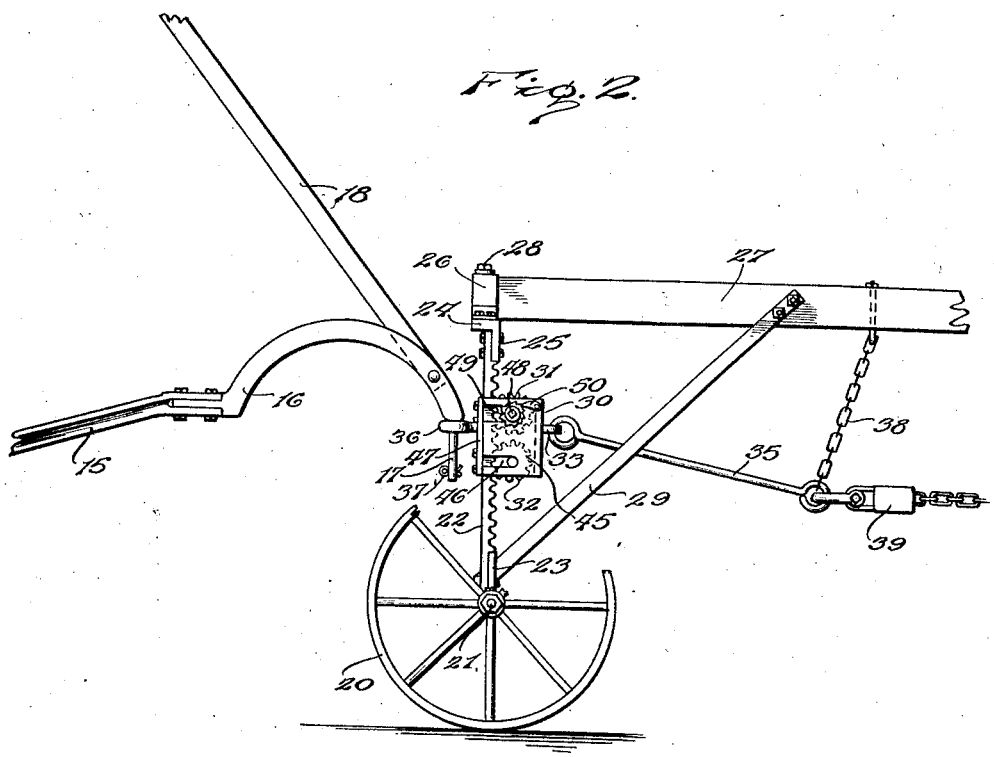
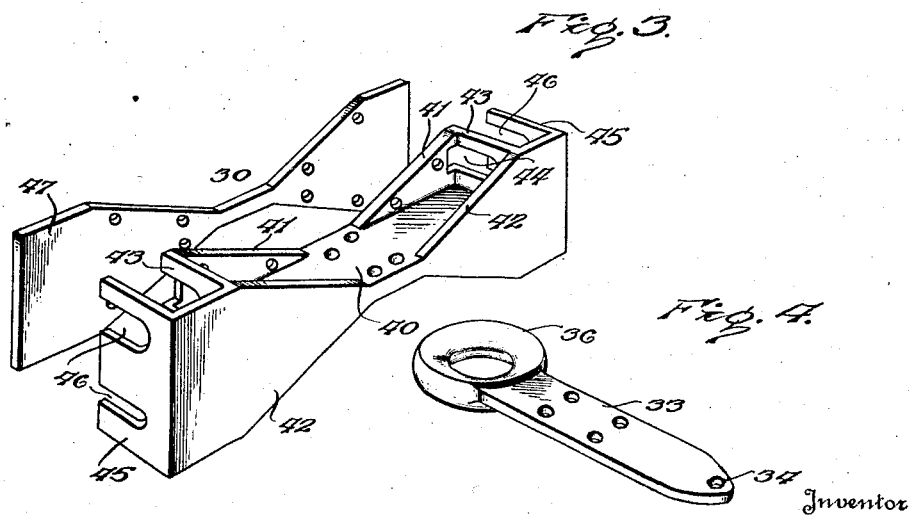
Inventor
John Roupp
By Lacy & Lacy, Attorneys Patented June 15, 1926.

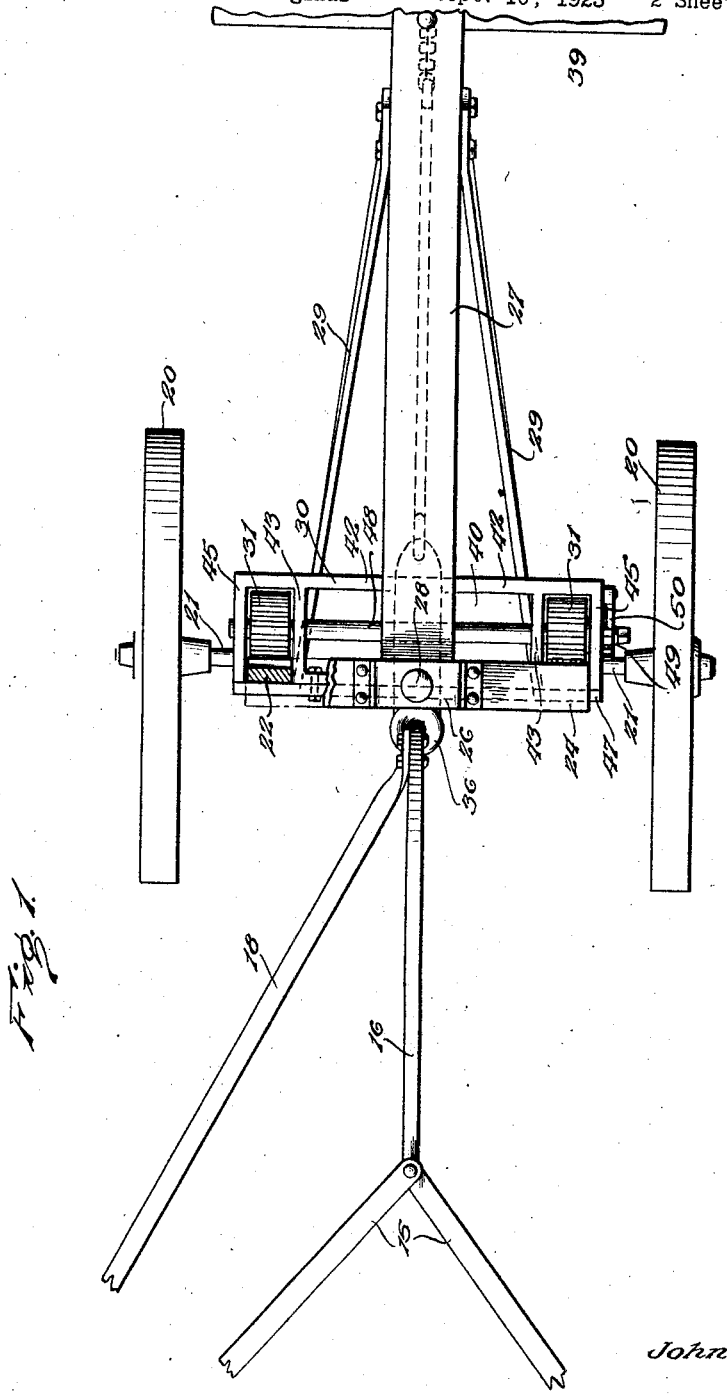

1,588,909

UNITED STATES PATENT OFFICE.

JOHN ROUPP, OF HESSTON, KANSAS.

FRONT TRUCK FOR CORN HARVESTERS.

Original application filed September 10, 1923, Serial No. 661,847. Divided and this application filed October 23, 1924. Serial No. 745,441.

This application is a division of an application filed by me September 10, 1923, Serial No. 661,847.

The present invention relates to the front truck or support for a corn-topping machine, and one object is to provide a strong support for the front portion of the topping machine whereby the draft will be advantageously applied to the machine without imposing burdensome weight on the draft animals. Another object of the invention is to provide a truck in which the point at which the frame is supported may be easily adjusted vertically and the efficiency of the apparatus maintained in all adjustments. Other objects will appear in the course of the following description and the invention resides in certain novel features which will be particularly pointed out in the appended claims.

In the accompanying drawings:

Figure 1 is a plan view, partly broken away, of a truck embodying the invention;

Fig. 2 is a side elevation;

Fig. 3 is a perspective view of the vertically movable yoke, and

Fig. 4 is a perspective view of the member whereby the yoke is connected with the main frame.

In carrying out the present invention, I secure to the lower portion of the front side of the main frame of the topping machine the forwardly and upwardly converging draft frame bars 15 which are secured together at their forward extremities, and to the said joined extremities I secure the rear end of an arch 16 which terminates at its front end in a depending straight pintle 17 which is of circular outline in horizontal section. A brace 18 extends from the upper end of the main frame of the topping machine to the forward portion of the arch 16 and has its ends rigidly secured to the said members, thereby rigidly connecting the arch to the upper portion of the main frame so that dropping of the arch is prevented and draft is applied to the upper portion of the main frame as well as to the lower portion thereof.

The front truck is supported by wheels 20 which may be of any well-known or preferred form and are carried by spindles 21 which have their inner ends flattened and upturned to be rigidly secured to the lower extremities of vertically disposed rack bars 22, the upturned attaching terminals of the spindles being shown at 23. The said rack bars 22 are connected at their upper ends by a bridge piece or cross bar 24 whereby a rigid truck frame is produced, the ends of the said bridge piece or cross bar being turned downwardly so as to fit flat against the upper ends of the rack bars and be secured thereto, as shown at 25. Upon the said cross bar 24 at the center of the same, I secure a socket or bracket 26 which receives the rear end of the tongue or pole 27 which is rigidly secured therein by a bolt 28 inserted vertically through the tongue and the cross bar, as will be readily understood. The rigidity of the truck is further increased by the provision of braces 29 which extend between the tongue and the lower ends of the rack bars and are rigidly secured thereto, as shown. Mounted for vertical movement upon the rack bars is a yoke or coupling head 30 which carries pinions 31 and 32, meshing with the rack bars, and is constructed to slidably fit around the rack bars so as to be held to a rectilinear path and maintain the engagement of the pinions with the rack bars. A draft coupling plate 33 is secured rigidly to the yoke or head 30 and is provided at its front end with an opening 34 in which is engaged the rear end of a draft rod 35 and is provided at its rear end with a horizontally disposed eye 36 through which the pintle 17 loosely engages. A cotter pin or other retaining device 37 may be provided at the lower end of the pintle 17 so that, while vertical movement of the coupling plate relative to the pintle is permitted, the separation of the parts will be prevented. The front end of the draft rod 35 is suspended from the tongue by a chain or other flexible support 38 and the whiffletrees or draft-applying devices, indicated at 39, are connected with the front end of the said draft rod. The yoke or coupling head 30 comprises a horizontally disposed web 40 having vertical webs 41 and 42 integral with its rear and front edges respectively, the said vertical webs or flanges diminishing in height inwardly toward the center of the yoke, and the coupling plate 33 is secured rigidly upon the upper side of the web 40 at the center of the same. The front vertical webs 42 extend laterally beyond the webs 41 and are connected therewith by cross webs 43 constructed with horizontal slots 44. At the extremities of the webs 42 are rearwardly projecting flanges or webs 45 which terminate in the vertical plane of the web 41 and are constructed with open-ended slots or notches 46 corresponding to the slots or notches 44. The pinions 31 and 32 are provided with hub or axle members which are engaged in the slots or notches 44 and 46 and are moved forwardly therein so as to be journaled at the front ends of the same. The rack bars 22 fit between the webs 43 and 45 and are held in such position and in mesh with the pinions 31 and 32 by a back plate or cap plate 47 which corresponds in outline to the webs 42 and is bolted or otherwise rigidly secured to the webs 41. The yoke is thus mounted upon the rack bars 22 so as to be carried by the same and be movable vertically thereon, and the vertical movement of the yoke will, of course, carry with it the draft coupling plate 33 and effect vertical adjustment of the arch 16. The upper pinions 31 have central openings therethrough of an angular outline and through the said openings is fitted a bar 48 or similar cross sectional contour so that these pinions will be caused to rotate in unison, the said bar extending from side to side of the yoke 30 and projecting beyond one end of the same to be engaged by a wrench or other turning tool. That pinion 31 which is mounted upon the bar 48 adjacent the extended end of the same is formed integral with a ratchet disk 49, and a pawl 50 is mounted upon the adjacent end of the yoke 30 to engage said ratchet disk and prevent backward movement of the same. When it is desired to adjust the frame vertically, a wrench or other turning tool is applied to the end of the bar 48 and the said bar is rotated in an obvious manner so that the upper pinions 31 will be rotated in such a direction as to move upwardly upon the rack bars, the pawl 50 serving to hold the device in the position to which it may be adjusted. If it be desired to set the frame at a lower point relative to the rack bars, the pawl is simply released, whereupon the weight of the parts will cause them to move downwardly. The pawl may be held in its normal position in engagement with the ratchet disk by gravity or may be spring-pressed, as will be obvious. By providing the pinions at both ends of the yoke, the two ends of the yoke are caused to move uniformly and by providing the lower pinions 32 any tendency of the yoke to twist relative to the rack bars will be avoided.

Having thus described the invention, I claim:

1. The combination of a draft member, a pintle depending from the front end of the draft member, a truck in front of the draft member, and a coupling carried by the truck and vertically adjustable thereon and pivotally and slidably engaged with said pintle.

2. The combination of forwardly extending draft members, a front truck including transversely spaced vertical rack bars, a yoke fitted to said rack bars for vertical movement thereon, a coupling plate carried by said yoke and having sliding pivotal connection with the said draft members, and means upon said yoke to engage the rock bars for effecting vertical movement thereof and sustaining it at any desired position of vertical adjustment.

3. The combination of forwardly extending draft members, a front truck comprising vertically disposed transversely spaced rack bars, a yoke slidably mounted upon said rack bars, a draft coupling secured to said yoke and having slidable and pivotal engagement with the said draft members, pinions mounted in the ends of said yoke and engaging said rack bars, and means connected with one of said pinions for preventing rotation of the same.

4. The combination of forwardly extending draft members, a front truck, a coupling mounted upon said truck and movable vertically thereon, said coupling having pivotal and slidable engagement with the front ends of said draft members, a tongue projecting forwardly from the truck, a flexible hanger suspended on the tongue, a draft rod carried by the said coupling and said hanger, and draft devices carried by the front end of said draft rod.

5. The combination of draft members having a pendent pintle at the front end thereof, a truck in front of said members including a pair of rigidly connected vertical transversely spaced rack bars, a yoke having transversely spaced vertical webs at its ends to span the rack bars, a cap plate bridging the webs and the rack bars to retain the yoke upon the rack bars, pinions mounted between the spaced vertical webs of the yoke and meshing with the rack bars, means for holding the pinions in a set position, a coupling plate carried by the yoke and projecting in front and in rear thereof, the rear end of said plate being pivotally and slidably engaged about the pintle, and draft devices connected to the front end of said plate.

In testimony whereof I affix my signature.

JOHN ROUPP. [L. S.]